July 25, 1939.  J. LADDAGA  2,167,260
FARE PROTECTIVE SHIFT GEAR LOCK FOR TAXICABS
Filed Nov. 20, 1937   3 Sheets-Sheet 3
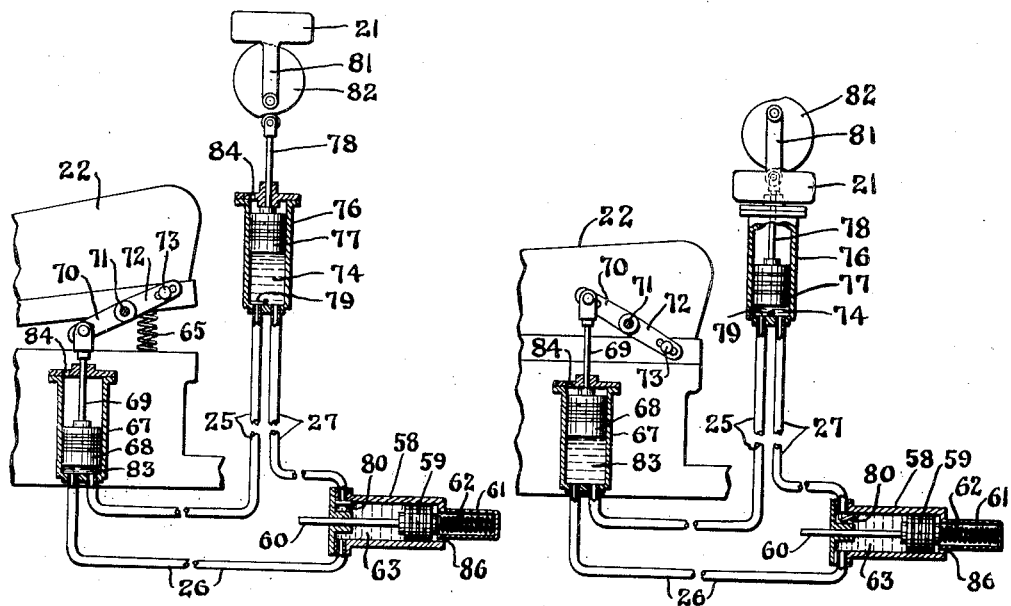
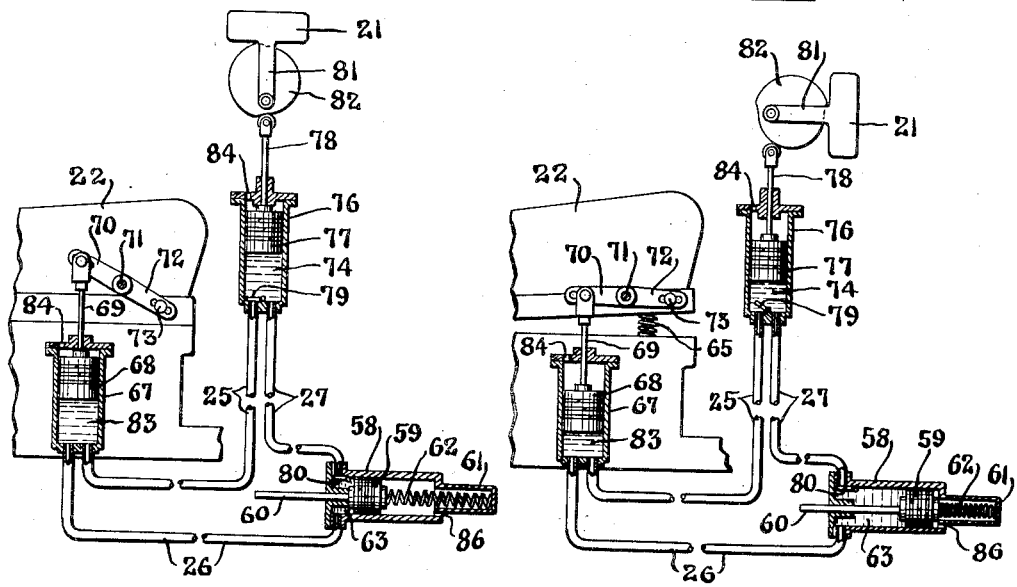
INVENTOR.
Joseph Laddaga
BY
ATTORNEY.

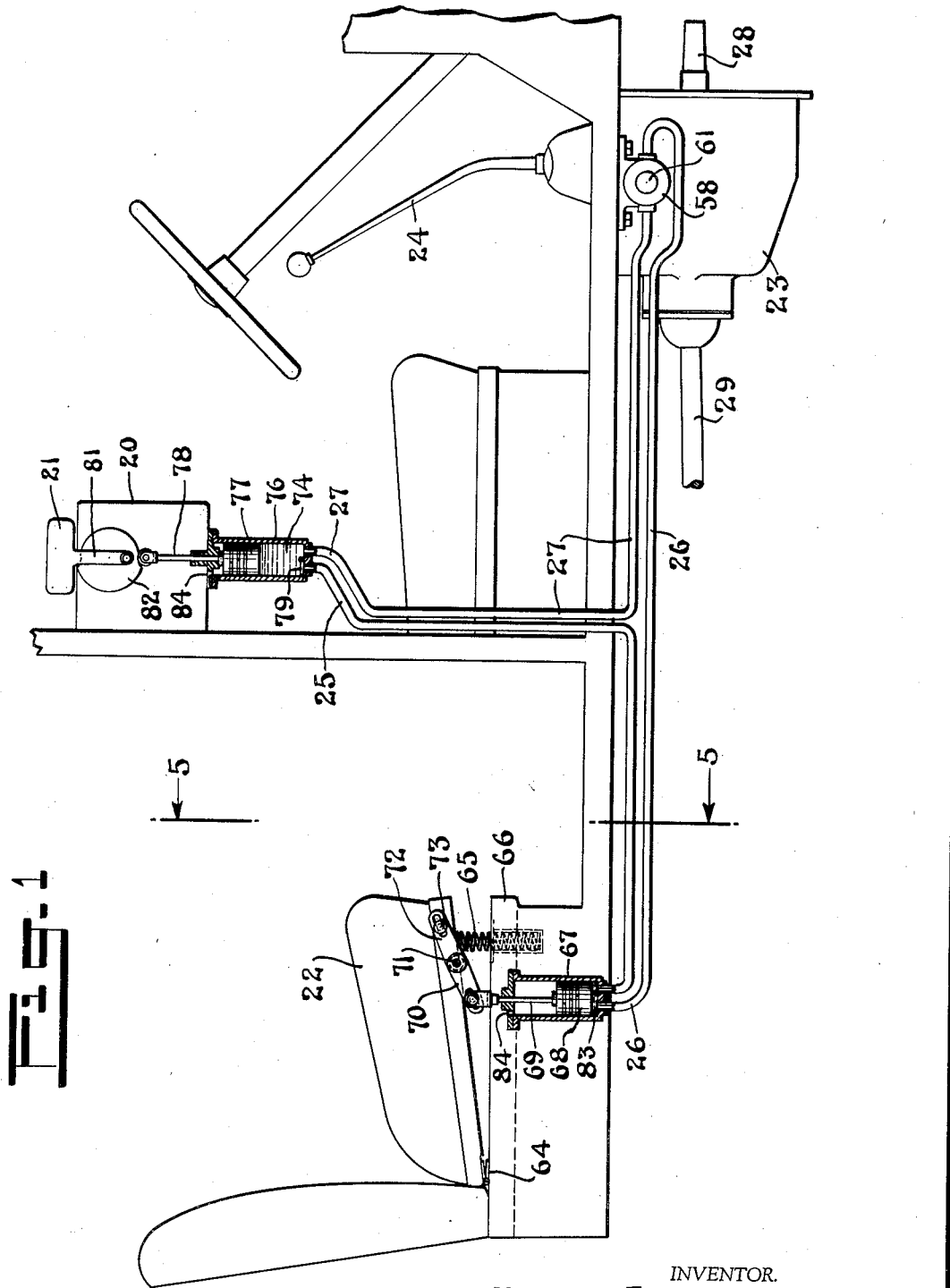

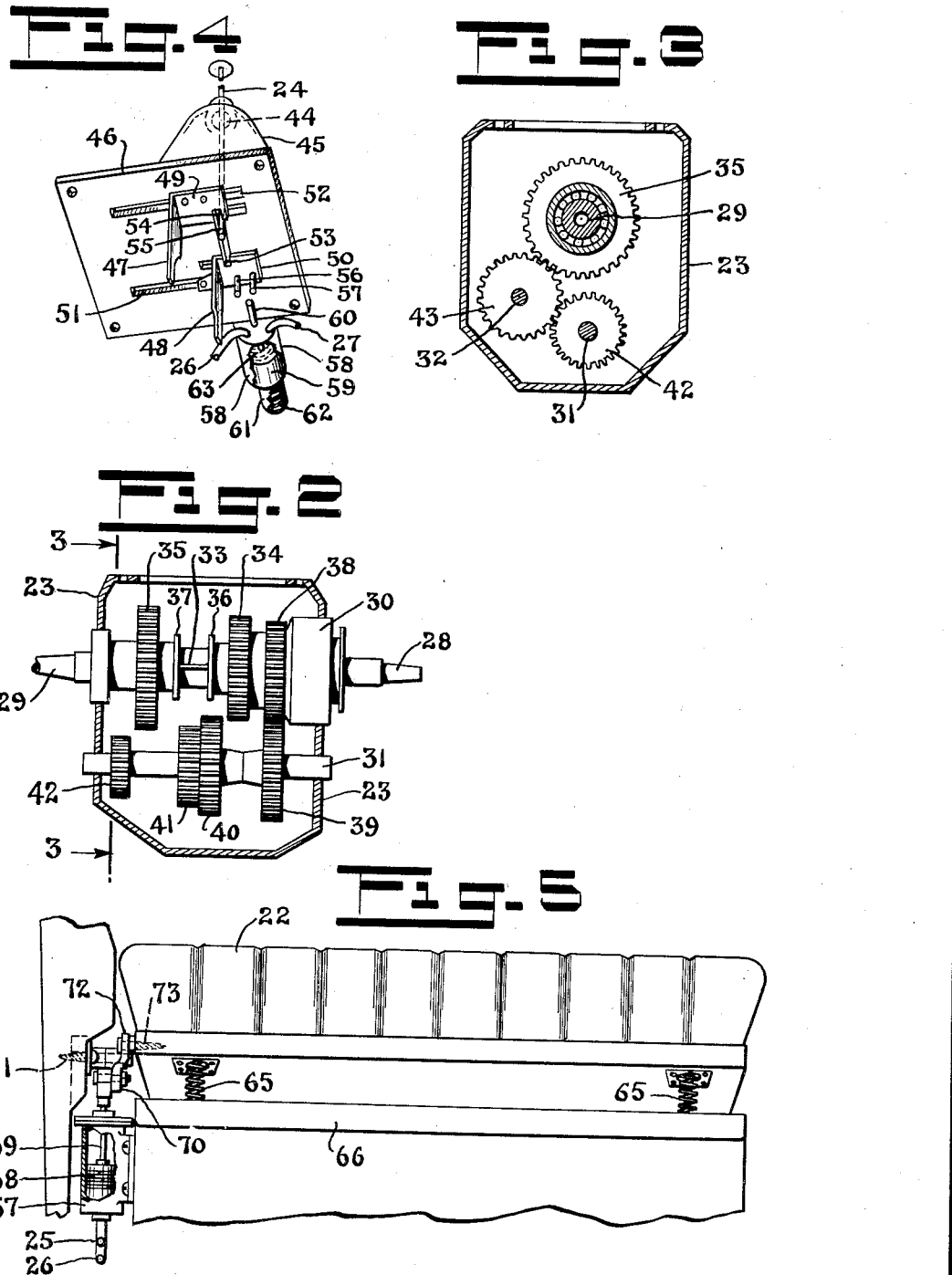

Patented July 25, 1939

2,167,260

UNITED STATES PATENT OFFICE 2,167,260

FARE PROTECTIVE SHIFT GEAR LOCK FOR TAXICABS

Joseph Laddaga, New York, N. Y., assignor of one-third to William L. Morris, New York, N. Y.

Application November 20, 1937, Serial No. 175,587

22 Claims. (Cl. 180—82)

The present invention relates to controls for taxi-cabs, whereby to permit drive of the cab in low forward speed and reverse, while preventing drive at higher speeds, when the meter flag is up and a passenger is in the cab.

The purpose of such a control is to hold the driver to a true accounting of fares, by making transportation of passengers impracticable unless the meter is set to record the fare. The purpose of an allowable drive in low speed or reverse at all times is to permit the cab to be shifted or moved when desired, as for instance, when in a waiting line.

To hold the driver to a true accounting, various electrical and other devices, interconnecting the passenger seat with the meter flag and ignition, have heretofore been devised. So far as I am aware, however, such previously existing devices have not been designed to permit of drive in low and reverse, when effective, and have been unreliable, because of the ingenuity of drivers in temporarily and at will disabling the same. It is obvious that electrical connections for this purpose are easily and quickly disabled, and as easily restored to effective position, by experienced drivers, with resultant great loss in revenue to the cab owners.

An object of my invention is the provision of relatively inexpensive and durable connections between the passenger seat, the meter setting device or flag, and the gear shift lever or other control, such that, when effective, a drive in either low or reverse is permissible, while drive at higher speeds is impossible, and such that disabling of the connections cannot be effected without injury thereto, requiring repairs beyond the convenience of the driver. In such a device, it is a feature of the invention, in the preferred embodiment thereof, that the weight of a passenger on the passenger seat, when the flag is up, automatically locks the selective speed transmission against shift to second and higher speeds. The transmission employed may be the so-called standard or universal gear shift.

In its preferred embodiment, the invention comprises a passenger seat normally held somewhat elevated, but which when depressed by the weight of a passenger, operates a device for locking the gear shift lever against the movements required for shift to second and higher speeds, when the meter flag is up. The locking is effected by interrelated connections from the meter flag and passenger seat to the locking device. In the form of the invention hereinafter described, these connections are hydraulic, that is to say, consist of pipe lines containing water, oil, or other relatively incompressible liquid, valve controlled, and having plungers whereby to shift the liquid by movement of the meter flag and seat, and so to actuate the locking device.

In the aforesaid preferred embodiment of the invention, a feature thereof is an arrangement and operation of the valves and plungers such that any tampering with the system, as by drilling, draining, refilling and plugging of the pipes, automatically causes the locking device to become and remain effective against drive of the cab in second or higher speeds.

Other objects and features of the invention will more fully appear upon reference to the accompanying drawings, in which:

Fig. 1 is a view in side elevation of a part of a taxi-cab having a preferred form of the invention embodied therein, certain parts being broken away for clearer illustration thereof.

Fig. 2 is a view in longitudinal side elevation of a so-called standard or universal shift gear set-up, the gears being in neutral position.

Fig. 3 is an end view taken on the line 3—3 of Fig. 2, looking in the direction of the arrows, and showing the so-called reverse idler in its relation to the other gears.

Fig. 4 is an underneath view in perspective of the cap of the shift gear casing of Fig. 2, and showing the shift gear lever and a standard type of selective shift elements, and showing also a shift lock and connecting elements according to the present invention.

Fig. 5 is a view taken in cross-section on the line 5—5 of Fig. 1, looking in the direction of the arrows.

Fig. 6 is a diagrammatic view of the gear shift control, showing the position of the parts when the meter flag is up, and no passenger is on the seat.

Fig. 7 is a view similar to that of Fig. 6 showing the position of the parts when the meter flag is down and a passenger is on the seat.

Fig. 8 is a view similar to that of Fig. 6, showing the position of the parts when the meter flag is up and a passenger is on the seat.

Fig. 9 is a view similar to that of Fig. 6, showing an intermediate position of the parts while the flag is being lifted after a passenger arises from the seat.

Referring to the drawings, and more particularly to the general assembly shown somewhat diagrammatically in Fig. 1, there is indicated a fare meter 20, provided with a flag 21 for setting and unsetting the same, a spring elevated passenger seat 22, a selective speed transmission casing 23 with gear-shift lever 24, and hydraulic interconnections 25, 26 and 27 between the meter, the passenger seat and the gear shift mechanism. These connections will hereinafter be described in detail.

In Figs. 2, 3, and 4 is shown a standard selective speed transmission, the details of which are well understood, but which are more fully shown and described in a work entitled, "Automobile Engineering", vol. 2, pages 348 to 353, published by American Technical Society, Chicago, 1934. The drive is from the clutch shaft 28 to the transmission shaft 29, when the clutch 30 is effective and the gears are properly shifted. The casing 23 provides bearings for shafts 28 and 29, as well as for countershaft 31, and an idler shaft 32, (see Fig. 3).

The transmission shaft 29 is splined, as at 33, to gears 34 and 35 to permit the gears to be independently slid therealong. For sliding of gear 34, a collar 36 is provided, and for sliding of gear 35, a collar 37 is provided. In Fig. 2 the gears are shown in neutral position. When gear 34 is moved forward from this position, it locks with a gear 38 on the clutch shaft, and the drive is then a high speed drive directly from the clutch shaft to the transmission shaft. Gear 38 is, however, in constant mesh with a gear 39 keyed on countershaft 31; so that whenever the clutch shaft rotates, the countershaft rotates. Also in fixed positions on the countershaft 31 are gears 40, 41 and 42.

If from Fig. 2 position the gear 34 is shifted rearward, it meshes with gear 40, and the drive will be second speed forward through gears 38, 39, shaft 31, and gears 40 and 34 to the transmission shaft 29.

If from Fig. 2 position the gear 35 is shifted forward, it will mesh with gear 41, and the drive will be a low speed forward drive through gears 38, 39, shaft 31, and gears 41 and 35 to the transmission shaft 29.

The so-called idler shaft 32 (see Fig. 3) carries an idler gear 43 which is in mesh with gear 42 on shaft 31; and, if from Fig. 2 position the gear 35 is shifted rearward, it will mesh with idler gear 43, and the drive will be a reverse drive through gears 38, 39, shaft 31, and gears 42, 43 and 35 to the transmission shaft.

The gears 34 and 35 are shifted by well known means, shown in Fig. 4. In this figure the shift lever 24 is shown ball-pivoted at 44 for universal movement in the dome 45 of a cap 46 of the gear casing 23. On the inner face of the cap plate 46 are two yoke pieces 47 and 48, respectively for engagement with the collar 37 for shifting gear 35, and with collar 36 for shifting gear 34. These yoke pieces are carried by slides 49 and 50 respectively, which are movable in grooved ways 51 and 52 in the cap plate 46. The slides 49 and 50 are oppositely notched at 53 and 54, so that, according to the side to which the shift lever 24 is rocked, the lever engages one or the other, but one only, of the slides 49 and 50; and may then be rocked forward or backward for the shifting of the gears controlled by yoke pieces 47 and 48.

In the Fig. 4 arrangement, the yoke piece 47 is that which shifts the gear 35 for low, reverse and neutral settings; and the yoke piece 48 is that which shifts the gear 34 for second and high forward speeds, and for neutral. It will therefore be seen that since the purpose of the present invention is not to interfere with shift into low or reverse, but is to control shift into second and high, all that is necessary is to provide means for locking the slide 50 and yoke 48 against movement. For this purpose, a pair of pins 56 and 57 which protrude through the slide 50 and into the grooveway 51 in cap plate 46, to guide the slide on the cap plate, are conveniently used here to lock the slide against shift for second or high.

On the side wall of the gear shift casing 23, see Figs. 1 and 4, is mounted a cylinder 58 having a piston or plunger 59 slidable therein. Piston 59 carries a rod or pin 60 which has a sliding fit in the end of the cylinder 58 and through the side wall of casing 23, so that when the rod 60 is moved inward, it may interlock with pins 56 and 57 on slide 50, to prevent shift of gear 34 for second and high speeds.

An outer extension 61 of cylinder 58 supports a coil spring 62, which bears on piston 59, and is tensioned at all times to urge the rod 60 to gear-locking position; and which when the meter flag 21 is up and a passenger is on the passenger seat does so lock the gear shift to prevent shift to second and high. Within the cylinder 58 there is, at certain times, however, a liquid, indicated at 63, which resists the action of spring 62, and holds the lock in ineffective position. The pressure and movement of this liquid is controlled on the one hand by hydraulic connection 26 to the passenger seat, and on the other hand by hydraulic connection 27 to the fare meter.

Passenger seat 22, see Fig. 1, is pivoted at its rear, at 64, to the cab frame. Coiled springs 65, seated upon cross frame member 66, bear against the bottom of the seat and tend to hold the seat elevated as in Figs. 1 and 5. Mounted on the cab frame adjacent the seat is a cylinder 67 having a piston or plunger 68 slidable up and down therein. A rod 69 extends from the piston 68 through the top of the cylinder to connect with one arm 70 of a bell crank lever pivoted at 71 to the cab frame. The other arm 72 of the lever connects at 73 to the side of the seat. It follows that when the seat is depressed, the piston 68 moves up, and vice versa. Into the cylinder 67, below the piston 68, lead the hydraulic connections 26 and 25, from the gear-shift lock and fare meter, respectively.

The fare meter 20, see Fig. 1, is shown as having a cylinder 76 secured to the base thereof. Slidable in the cylinder 76 is a piston 77 having a piston rod 78 connected therewith. The hydraulic connections 25 from the cylinder 67 at the passenger seat, and 27 from the cylinder 58 at the gear lock, lead into the cylinder 76 below the piston 77. The connection 25 is valved at 79. When the flag is up and the cab is idle, the valve 79 is gravity closed, as in Fig. 1. As presently to be seen, however, valve 79 may open upward to admit liquid into cylinder 76 from seat cylinder 67 as the seat moves to elevated position, upon the rising of a passenger from the seat, and upward movement of piston 77. Liquid is indicated at 74 in the cylinder 76, below the piston 77, in the Fig. 1 position of the parts.

The flag post 81 carries a cam 82, which when the flag is put down, engages the end of the piston rod 78 in such manner as to force down the piston 77. At this time the valve 79 is closed, and the downward movement of piston 77 with the flag cannot therefore force any of the liquid 74 into the line 25. Line 27 is, however, open to liquid 74, and the pressure of the descending piston 77 forces open a valve 80 in that line, at the gear lock cylinder 58, thus communicating the pressure on liquid 74 to liquid 63 in cylinder 58.

Turning now to the diagrams of Figs. 6 to 9, inclusive, it is to be remembered that there are at least four driving conditions, to wit:

(a) The driver may be cruising with his flag up and no passenger on the passenger seat. This is permissive and even necessary. This is Fig. 6 position of the parts.

(b) The driver may have a passenger on the seat, and the flag down. This is a paying fare. This is Fig. 7 position.

(c) The driver may have the flag down, although the passenger is absent from the cab. He is now recording time, for a paying fare. In this case, the seat is held down by reason of pressure of liquid from meter cylinder 76 through line 27, gear-lock cylinder 58, line 26 and seat piston 68. In this instance, the parts remain in Fig. 7 position.

(d) The driver may have the flag up and a passenger on the seat. This is a non-paying passenger, and drive in second or higher speeds is impermissible.

Only in case (d), therefore, are the gears locked against shift to second and higher speeds.

In case (a), illustrated in Fig. 6, the piston 77 in the cylinder at the meter is at the upper end of its stroke. This is the normal or idle condition of the cab. The cylinder 76, below the piston 77 has at a previous time been pumped full of liquid through line 25 by depression of the piston 68 at the passenger seat, caused by the action of the seat springs 65 on discharge of a previous fare. The suction created in line 27 by the last upward movement of meter piston 77 has closed valve 80 at the gear-lock cylinder 58. Escape of liquid from the gear-lock cylinder to the meter cylinder, by way of the line 27 is therefore impossible, and escape of liquid from the gear-lock cylinder to the seat cylinder by way of the line 26 is rendered impossible by reason of the position of the piston 68 in the seat cylinder. The liquid 63 in the gear-lock cylinder, and in the line 26, therefore holds the lock actuating piston 59 against the action of the spring 62, and the cab is free to be driven in second and higher speeds.

If now, a passenger gets into the cab, and the driver throws down the flag, the seat piston 68 rises. This results in suction of liquid from gear-lock cylinder 58 to seat cylinder 67, and forcing of liquid from meter cylinder 76 to gear-lock cylinder 58, because, as piston 68 moves up, piston 77 descends and opens the valve 80 in cylinder 58. Valve 79 at the meter cylinder being closed, no liquid can pass from that cylinder to the seat cylinder by way of the line 25. The result is that, although the liquid in gear-lock cylinder 58, which has been holding lock piston 59 against the action of spring 62, has now been sucked and forced into seat cylinder 67, nevertheless it has been replaced by liquid from meter cylinder 76, so that piston 59 in the gear-lock cylinder continues to be held against the action of spring 62. This is the Fig. 7 setting of the parts.

If now the passenger leaves the cab without discharging it, the flag remains down, and waiting time is being recorded. Meter piston 77 therefore remains down, and there can therefore be no release of liquid from the gear-lock cylinder through line 27. Meter piston 77 being down, and valve 79 at the meter cylinder being necessarily closed, there can be no escape of liquid from the seat cylinder to the meter cylinder through line 25. Liquid in the seat cylinder 67 below the piston 68, must remain there, preventing lifting of the seat by springs 65. Since this liquid 83 in the seat cylinder cannot be released to meter cylinder 76, there is no escape for any of the liquid 63 in the gear-lock cylinder 58, and the lock rod 60 continues to be held against the action of spring 62, in ineffective position, as shown in Fig. 7.

If, however, with the parts in Fig. 6 position, a passenger is seated upon the passenger seat, and the driver fails to drop the flag, the piston at the seat rises, creating a suction through line 26, to drain gear-lock cylinder 58. This suction holds closed the valve 79 at the meter cylinder. The line 27 is now open for flow of liquid from meter cylinder 76 to gear-lock cylinder 58, but drainage of the latter to the seat cylinder 67 has released the hydraulic pressure necessary to hold movement of lock rod 60 against the action of the spring 62. Therefore the lock rod 60 is thrown to lock the gears against shift into second or higher speeds. This is case (d) of the abovementioned four driving conditions, in which the parts assume Fig. 8 position.

Air vents 84 and 85 are indicated in tops of the cylinders 67 and 76 to prevent vacuum interference with free movement of the pistons of those cylinders, and an air vent 86 may be provided in the bottom of cylinder 58 for the same purpose.

It remains to be shown the movements of the valves and liquid after discharge of a passenger, and during upward throw of the flag to "vacant" condition of the cab. In Fig. 9 is shown the position of the parts at midway position of the flag on its upward throw. At this time, the meter piston 77 has reached half way position on its upward movement, and the seat piston has reached half way position on its downward movement. Piston 77 has sucked open the valve 79 at the meter, and by suction, is now draining the liquid 83 in the seat cylinder, into the meter cylinder through the line 25. The upward movement of meter piston 77 has sucked closed the valve 80 at the gear-lock cylinder 58, preventing passage of liquid from the cylinder 58 to the cylinder 76 by way of the line 27. The descent of the seat piston 68 precludes escape of liquid from the gear lock cylinder to the seat cylinder through line 26. Therefore, during this back to normal setting of the parts, the liquid 63 in the gear-lock cylinder continues to hold the lock against the action of the spring 62.

A consideration of the above described connections and operations will show that any attempt at tampering with the system, as by drilling and draining of any of the lines 25, 26 and 27, can only result in release of the pressure of the liquid 63 in gear lock cylinder 58, in opposition to the action of the spring 62, thereby permitting the spring to act, and automatically locking the gear shift against drive in second or higher speeds.

To prevent access to the spring 62, as by drilling or disassembling of the gear-lock cylinder 58, or spring casing 61, these latter are preferably made of hardened steel, and are either made as a unit, or are welded together, and the cylinder 58 welded to the shift gear casing 23 or to its cap 46.

I claim:

1. A shift gear control for taxi-cabs, comprising a shift gear selective transmission for low, second, and higher forward speeds, and for reverse, means for disabling the gear shift to second and higher forward speeds, a fare meter, a flagged device for at will rendering the meter either operative or inoperative, a connection from the flagged device to the shift gearing for controlling the operation of the latter, a passenger seat, a connection from the seat to said shift gearing, also for controlling the operation of the latter, and means whereby, when the meter is inoperative and a passenger is seated, said shift-gear connections render impossible a shift to second or higher forward speeds, but leaves said shift gear free for shift to low forward speed and reverse.

2. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a connection from the flagged device to said gear lock for controlling the operation of the latter, a passenger seat, normally elevated but depressible by the weight of the passenger, a connection from the seat to said gear lock, also for controlling the operation of the latter, means whereby, when the meter is inoperative and a passenger is seated, said lock connections render the lock operative, and means for returning the seat to elevated position and for disabling the lock when the passenger is off the seat.

3. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a hydraulic connection from the flagged device to said gear lock for controlling the operation of the latter, a passenger seat, normally elevated but depressible by the weight of the passenger, a hydraulic connection from the seat to the gear lock, also for controlling the operation of the latter, and means whereby, when the meter is inoperative and a passenger seats himself, the liquid in said hydraulic connections is shifted to render the lock effective.

4. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a hydraulic connection from the flagged device to said gear lock for controlling the operation of the latter, a passenger seat, normally elevated but depressible by the weight of the passenger, a hydraulic connection from the seat to the gear lock, also for controlling the operation of the latter, means whereby, when the meter is inoperative and a passenger seats himself, the liquid in said hydraulic connections is shifted to render the lock effective, and means whereby when the meter is operative and a passenger is on the seat, the liquid in the hydraulic connections holds the lock in ineffective position.

5. A shift gear control for taxi-cabs, comprising a shift gear selective transmission for low, second, and higher forward speeds, and for reverse, a lock for disabling the gear shift to second and higher forward speeds while leaving the gear shift free to shift to low forward and reverse, a fare meter, a flagged device for at will rendering the meter either operative or inoperative, a spring for throwing the lock to effective position, a passenger seat normally elevated but depressible by the weight of a passenger, and movable connections from the flagged device and the seat for holding the lock in ineffective position against the action of the spring when no passenger is on the seat and the meter is inoperative.

6. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a spring for throwing the lock to effective position, a passenger seat normally elevated but depressible by the weight of a passenger, and movable connections from the flagged device and the seat for holding the lock in ineffective position against the action of the spring when a passenger is on the seat and the meter is operative.

7. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a spring for throwing the lock to effective position, a passenger seat normally elevated but depressible by the weight of a passenger, movable connections from the flagged device and the seat for holding the lock in ineffective position against the action of the spring when a passenger is on the seat and the meter is operative, and means whereby said connections are rendered ineffective to hold the lock against the action of the spring when the meter is inoperative and a passenger is on the seat.

8. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a spring for throwing the lock to effective position, a passenger seat normally elevated but depressible by the weight of a passenger, and hydraulic connections from the flagged device and the seat for holding the lock in ineffective position against the action of the spring when no passenger is on the seat and the meter is inoperative.

9. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a spring for throwing the lock to effective position, a passenger seat normally elevated but depressible by the weight of a passenger, and hydraulic connections from the flagged device and the seat for holding the lock in ineffective position against the action of the spring when a passenger is on the seat and the meter is operative.

10. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a spring for throwing the lock to effective position, a passenger seat normally elevated but depressible by the weight of a passenger, hydraulic connections from the flagged device and the seat for holding the lock in ineffective position against the action of the spring when a passenger is on the seat and the meter is operative, and means whereby said connections are rendered inoperative to hold the lock against the action of the spring when the meter is inoperative and a passenger is on the seat.

11. A shift gear control for taxi-cabs, comprising a shift gear selective transmission for low, second, and higher forward speeds, and for reverse, a lock for disabling the gear shift to second and higher forward speeds, while leaving the gear shift free for shift to low forward and reverse, a fare meter, a flagged device for at will rendering the meter either operative or inoperative, a connection from the flagged device to said gear lock for controlling the operation of the latter, a passenger seat, normally elevated but depressible by the weight of a passenger, a connection from the seat to said gear lock, also for controlling the operation of the latter, and means whereby, when the meter is operative and a passenger seats himself, said lock connections automatically render the lock operative.

12. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a passenger seat normally elevated but depressible by the weight of a passenger, and movable connections from the flagged device and seat, manually controlled by setting of the meter and automatically controlled by seating of a passenger, for rendering the lock effective when the meter is inoperative and a passenger is seated.

13. A shift gear control for taxi-cabs, comprising a shift gear selective transmission for low, second, and higher forward speeds, and for reverse, a lock for disabling the gear shift to second and higher forward speeds while leaving the gear shift free for shift to low forward and reverse, a fare meter, a flagged device for at will rendering the meter either operative or inoperative, a passenger seat normally elevated but depressible by the weight of a passenger, a hydraulic connection from the seat to the gear lock, for controlling the operation of the latter, and pistons and valves in said hydraulic connection whereby when the meter is inoperative and a passenger seats himself, the liquid in said hydraulic connection is shifted to render the lock ineffective, and a hydraulic connection from the flagged device to the lock also controlling the operation of the latter, so that when the meter is operative with or without passenger on the seat said lock is rendered ineffective.

14. In a taxi-cab, a standard gear-shift, a fare meter, a flagged device for at will rendering the meter operative or inoperative, a passenger seat normally elevated but depressible by the weight of a passenger, means for locking the gear shift against shift to second or higher speed while leaving the gear shift free for shift to low forward and reverse, and interconnections between the flagged device, passenger seat and locking means, for rendering the latter effective when the meter is inoperative and a passenger is on the seat.

15. In a taxi-cab, a standard gear-shift, a fare meter, a flagged device for at will rendering the meter operative or inoperative, a passenger seat normally elevated but depressible by the weight of a passenger, means for locking the gear shift against shift to second or higher speed while leaving the gear shift free for shift to low forward and reverse, and hydraulical interconnections between the flagged device, passenger seat and locking means, for rendering the latter effective when the meter is inoperative and a passenger is on the seat.

16. In a taxi-cab, a standard gear-shift, a fare meter, a flagged device for at will rendering the meter operative or inoperative, a passenger seat normally elevated but depressible by the weight of a passenger, means for locking the gear shift against shift to second or higher speed while leaving the gear shift free for shift to low forward and reverse, and hydraulical interconnections between the flagged device, passenger seat and locking means, for rendering the latter effective when the meter is inoperative and a passenger is on the seat, and for rendering the locking means ineffective when the meter is operative.

17. In a taxi-cab, a standard gear-shift, a fare meter, a flagged device for at will rendering the meter operative or inoperative, a passenger seat normally elevated but depressible by the weight of a passenger, locking means for preventing gear shift against shift to second or higher speed while leaving the gear shift free for shift to low forward and reverse, and interconnections between the flagged device, passenger seat and locking means, for rendering the latter effective when the meter is inoperative and a passenger is on the seat, and for rendering the locking means ineffective when the meter is operative.

18. A mechanism as set forth in claim 1, having means for rendering effective the gear-shift disabling means whenever either of the connections thereto from the meter or seat is disabled.

19. A mechanism as set forth in claim 1, having means for automatically rendering effective the gear-shift disabling means when either of the connections thereto from the meter or seat is disabled.

20. A mechanism as set forth in claim 2, having means for rendering effective the gear-shift lock whenever either of the connections thereto from the meter or seat is disabled.

21. In a taxi-cab, a passenger seat, a fare meter, means for at will rendering the meter operative or inoperative, drive gearing, means for selectively setting said gearing for a low and for higher forward drives, and for reverse, and means for automatically preventing set of said gearing for said higher forward drives, while leaving the gearing free to be set for low forward and for reverse drive, when the meter is inoperative and a passenger is on the seat.

22. In a taxi-cab, a passenger seat, a fare meter, means for at will rendering the meter operative or inoperative, driving connections, means for selectively setting said connections for a low and for higher forward speeds, and for reverse, and means in part controlled from said seat by the weight of a passenger thereon, and in part from the meter, for automatically disabling the driving connections for said higher forward drives when a passenger is on the seat and the meter is inoperative, said disabling means being ineffective to prevent operation of said driving connections for low forward and reverse drives of the cab, when, as aforesaid, a passenger is on the seat and the meter is inoperative.

JOSEPH LADDAGA.